| United States Patent [19] | [11] Patent Number: 4,465,792 |
| Carr et al. | [45] Date of Patent: Aug. 14, 1984 |

[54] PROCESS FOR PRODUCING FLEXIBLE POLYESTER FOAM

[75] Inventors: Donald G. Carr, Chicago; John M. Blonn, Bolingbrook; Leonard E. Milawski, Carol Stream, all of Ill.

[73] Assignee: Standard Oil Company, a corporation of Indiana, Chicago, Ill.

[21] Appl. No.: 391,514

[22] Filed: Jun. 24, 1982

[51] Int. Cl.³ .............................................. C08J 9/00
[52] U.S. Cl. .................................... 521/138; 521/82; 521/84.1; 521/91; 521/92; 521/94; 521/96; 521/98; 521/110; 521/113; 521/122; 521/124
[58] Field of Search ...................... 521/138, 82, 84, 91, 521/92, 94, 96, 98, 110, 113, 124, 122

[56] References Cited

U.S. PATENT DOCUMENTS

| 2,733,221 | 1/1956 | Kish et al. | 521/120 |
| 2,979,469 | 4/1961 | Shannon et al. | 521/128 |
| 3,356,781 | 12/1967 | Sulewski et al. | 264/25 |
| 3,839,171 | 10/1974 | Akamatsu et al. | 204/159.19 |
| 3,855,160 | 12/1974 | Shiotsu et al. | 521/138 |
| 4,277,570 | 7/1981 | Michel | 521/138 |
| 4,314,036 | 2/1982 | Throne et al. | 521/138 |
| 4,327,196 | 4/1982 | West et al. | 521/125 |

*Primary Examiner*—John Kight, III
*Assistant Examiner*—Nathan M. Nutter
*Attorney, Agent, or Firm*—Robert C. Cochran; William T. McClain; William H. Magidson

[57] ABSTRACT

Flexible foam composition comprising a flexible polyester resin prepared from a resin having an elongation of 8 to 70 percent, said foams having density of 2 to 50 pounds per cubic foot. The foam can be filled with up to 150 parts by weight of inorganic materials and can be reinforced with porous fabric (paper or cloth) or glass (chopped fiber or woven tape) materials.

8 Claims, No Drawings

PROCESS FOR PRODUCING FLEXIBLE POLYESTER FOAM

This invention relates to flexible polyester foam.

Flexible foams are highly desirable in many applications such as artificial leather, shingles, insulation, upholstery, etc.

The term "flexible foam" as used herein means materials which recover upon release from compressive or stretching forces.

Those skilled in the art will recognize that there are generic differences between unsaturated polyesters and urethanes and epoxies. In general, urethanes and epoxies are foamed by intimate mixing of substantial amounts, and sometimes equal parts of reactants, this permitting control of the reactivity by uniformity in mixing. Catalysis for the reaction is brought about either by the reactants themselves or by additives to one of the reactant streams. This differs from the polyester system in which the reactive mixture (unsaturated polyester and unsaturated monomer) must be mixed with appropriate amounts of initiator and promoter (normally in ratios of 100:1 or so) to initiate reaction. Also, differences exist in the times for gellation and exothermicity. Urethanes show rapid temperature increases upon mixing and the majority of gellation occurs at or near the time when peak exotherm is reached. Therefore, the lower boiling halogenated hydrocarbons can be used since the exothermic energy is available to vaporize the foaming agent before full gellation prevents bubble growth.

For polyesters, on the other hand, it is well known that gellation can occur at or near room temperature and that the structure is approaching full crosslinking potential by the time the peak exotherm temperature is reached. (H. V. Boenig, "Unsaturated Polyesters: Structure and Properties," Elsevier Publishing Company, 1964, page 143.) As a result, a foaming agent which requires exothermic heat or energy to vaporize at or somewhat below room temperature will not be vaporized while the resin is still in a pregel state. By the time the vaporization energy is available to foam the resin, it has formed a strong gel and minimal (if any) foaming can take place.

Now, unexpectedly, we have found a system by which unsaturated polyester resins can be foamed to produce material similar to flexible urethane foams. Moreover, polyester resins have the advantage of being capable of being mixed with high filler loadings and have the property of wetting out a fibrous reinforcement, neither of these aspects being possible with flexible polyurethane.

The invention is based on the discovery that flexible unsaturated polyester resins can be foamed using a mixture of compounds which generate gas on mixing (e.g., sodium bicarbonate and phosphoric acid) or a physical blowing agent (e.g., chlorofluorohydrocarbons) with vacuum application after mixing.

An object of this invention is to prepare flexible unsaturated polyester foam. A further object of this invention is to provide a new method for a production of such foams. A further object is to provide construction materials such as insulation or shingles from saturated polyesters. A further object of this invention is to provide a synthetic material which can be substituted for leather which is becoming more and more expensive.

Broadly, our invention resides in a flexible foam composition comprising a flexible polyester resin prepared from a resin having an elongation of 8 to 70 percent (ASTM D638-76), said foams having a density of 2 to 50 pounds per cubic foot. This foam can be filled with up to 150 parts by weight of inorganic filler materials. Further, the foam can be made using a porous fabric reinforcement.

Another aspect of our invention resides in a process for producing a flexible foamed unsaturated polyester comprising mixing an unsaturated polyester resin diluted with a cross-linking vinylidene monomer to provide 30 to 80 weight percent non-volatile matter, a compatible surfactant, at least one initiator, at least one accelerator, and a physical blowing agent or materials capable of generating carbon dioxide or nitrogen on mixing, and allowing the mixture to foam and gel.

A further object resides in a process for producing flexible unsaturated polyester foams comprising mixing Components A and B, each of said Components comprising an unsaturated flexible polyester having an elongation of 8 to 70 percent, an unsaturated crosslinking monomer, a compound which releases carbon dioxide when contacted with an acid, an initiator, and an accelerator, wherein the accelerator in Component A is relatively inactive with the initiator in Component A but relatively active with the initiator in Component B, and the accelerator in Component B is relatively inactive with the initiator in Component B but relatively active with the initiator in Component A, adding an acid to said mixture and allowing said mixture to foam and gel.

Carbon dioxide generating compounds commonly used include ammonium and alkali metal carbonates and bicarbonates. Inorganic and organic acids can be used. Examples include hydrochloric, phosphoric, sulfuric, nitric, acetic, maleic, and picric acids.

An alternative to this process is to substitute a physical blowing agent such as a chlorofluorohydrocarbon for the carbon dioxide generating material and the acid.

Unsaturated polyesters are well known in the art and have been extensively studied; for details thereof, reference is made to "Unsaturated Polyesters: Structures and Properties" by Herman V. Boenig, supra. These unsaturated polyesters are the reaction product of one or more polycarboxylic acids and one or more polyhydric alcohols. One or more of the components of the polyester must be ethylenically unsaturated, preferably the polycarboxylic acid component. Typical unsaturated polycarboxylic acids include dicarboxylic acids and anhydrides such as fumaric acid, maleic acid, maleic anhydride, itaconic acid, citriconic acid, etc. Of these, maleic anhydride and fumaric acid are preferred. Typical saturated polycarboxylic acids include dicarboxylic acids such as phthalic acid, isophthalic acid, succinic acid, adipic acid, suberic acid, sebacic acid, azelaic acid, etc. Typical polyhydric alcohols include glycols, such as ethylene glycol, diethylene glycol, triethylene glycol, tetraethylene glycol, propylene glycol, dipropylene glycol, and hexylene glycol; triols, such as glycerin, trimethylol ethane, trimethylol propane, hexane triol, pentacrythritol, etc.

Useful in the present invention are flexible unsaturated polyester resins, these being commercially available items. The polyester should have elongation of 8 to 70 percent (ASTM D638-76) for good operation in the methods disclosed. Flexibility is generally obtained by using long chain polyhydric alcohols. Proprietary resins of this type are commercially available from a number of manufacturers.

The ethylenically unsaturated polyesters comprise from about 30 to 80 weight percent of the polymerizable resin-forming components. The remaining 70 to 20 weight percent of the polymerizable resin-forming ingredients comprise cross-linking vinylidene monomers selected from vinyl aromatics, such as vinyl toluene, styrene, alpha-methylstyrene, divinyl benzene, dichlorostyrene, alkyl esters of alpha, beta-ethylenically unsaturated monocarboxylic acids, such as methyl methacrylate, methylacrylate, ethylacrylate and 2-ethylhexycrylate, and vinyl esters such as vinyl acetate and propionate. The preferred vinylidene monomers are styrene and vinyl toluene. If desired, various other difunctional materials such as diallyl phthalate and triallyl cyanurate can be added to the composition.

Suitable physical foaming agents useful in this invention are lower boiling hydrocarbons and halogenated derivatives thereof. Some examples are listed in the following table:

| Foaming Agent | Boiling Point (1 ATM, °F.) |
|---|---|
| Refrigerant 11, $CCl_3F$ | 74.8 |
| Refrigerant 12, $CCl_2F_2$ | −21.6 |
| Refrigerant 21, $CHCl_2F$ | |
| Refrigerant 113, $CCl_2F-CClF_2$ | 117.6 |
| Refrigerant 142-B, $CCl_3CHF_2$ | 14.5 |
| Methylchloride | −11.2 |
| Methylene chloride | 105 |
| Chloroform | 142.2 |
| Carbon tetrachloride | 170.2 |
| Butane | 30.9 |
| Iso-butane | 69.7 |
| Pentane | 97.3 |
| Iso-pentane | 82.3 |
| Hexane | 156.2 |

The surfactants used are silicone-glycol based resins; Dow 200 in a dimethylpolysiloxane. Dow Corning 193 and 470-A resins are silicone-glycol copolymers as are surfactants sold under the trade designation of Air Products LK-221, LK-332, LK-443. Soap-type surfactants such as laurates and stearates are not successful. The surfactant should be oil-based to be compatible with the polyester resin system.

In addition to the components mentioned above, the foam can contain additives such as fillers, fire retardants, colorants, UV stabilizers, reinforcing material such as glass fibers, etc. Fillers, such as sand, can be used in amounts of 1 to 5 parts by weight per part of resin.

While the foams disclosed herein can be made by mixing all of the ingredients together at one time, we have used for convenience, the so-called "quick cure" system in which the polyester resin is divided into parts A and B and selected additives are used in each of these parts. The essential feature of this is in the selection of accelerator and initiator in each of the components to provide relatively long pot life for each component. More specifically, the final foaming material is prepared from a mixture of polyester resin and unsaturated crosslinking monomer. The steps include preparing parts A and B containing such material, adding initiator to each of the said parts, adding accelerator to each of the parts, the accelerator in part A being relatively inactive with the initiator of said part, but relatively active with the initiator in part B, and the accelerator in part B being relatively inactive with the initiator of said part B but relatively active with the initiator in part A. This produces a system which, on mixing, results in rapid curing of the entire composition.

Peroxides constitute the principal group of initiators with diacyl peroxides fitting into one class and peroxyesters and ketone peroxides in the second class. Diacyl peroxides are normally used with amines and mercaptans as accelerators, while metal salts are used with peroxyesters and ketone peroxides. Without desiring to be exclusive, as stated above, standard materials are used in our invention. Examples of diacyl peroxides include 2,4-dichlorobenzoyl peroxide, benzoyl peroxide, diisobutyryl peroxide, diisononanoyl peroxide, decanoyl peroxide, lauroyl peroxide, acetyl peroxide and succinic acid peroxide. Representative peroxyesters include t-butyl peroxybenzoate, t-butyl peroxyacetate, t-butyl peroxyisobutyrate, t-butyl-peroxy-2-ethylhexanoate, t-butyl peroxypivalate, t-butyl peroxyneodecanoate, t-butyl peroxymaleic acid, di-t-butyl diperoxyphthalate, 00-t-butyl-0-isopropyl monoperoxycarbonate, 2,5-dimethyl-2,5-bis(2-ethylhexanoyl-peroxy)hexane, and 2,5-dimethyl-2,5-bis(benzoylperoxy)-hexane. Ketone peroxides include methyl ethyl ketone peroxide, hydroxyheptyl peroxide, and 2,4-pentanedione peroxide.

Representative accelerators or promoters which supply the metal ions include salts and acetylacetonates of potassium, cobalt, copper, vanadium, manganese and lead. These materials should be soluble in the polyester mixture with common commercial products being octoates and naphthenates.

Suitable amine promoters include dimethyl aniline, diethyl anilines and dimethyl-p-toluidine. Sulfur compounds suitable as accelerators include dodecyl mercaptan and mercaptoethanol.

The following examples illustrate specific embodiments of my invention.

EXAMPLE 1

Using Richhold DD-2780-3 resin, flexible polyester containing 29 weight percent styrene having an elongation of 37 percent, a low density foam was prepared. Two resin Components A and B were first mixed according to the following recipes, the amount being given in weight parts per 100 parts resin/styrene mixture.

| | Part A | Part B |
|---|---|---|
| DD-2780-3 | 100 | 100 |
| Hydrated alumina | 100 | 100 |
| Surfactant[1] | 5 | 5 |
| Cardox 40E[2] | 5 | — |
| Cobalt (12%) | 0.3 | — |
| Potassium Hex-cem[3] | 0.4 | — |
| Lupersol 256[4] | — | 0.5 |
| Lupersol DDM[5] | — | 0.5 |
| Dimethyl-para-toluidine | — | 0.8 |

[1] Dow Corning 193 silicone-glycol copolymer
[2] 50% Benzoyl peroxide in diisobutyl phthalate Armack Chemicals Process Co.
[3] Proprietary organic salts sold as accelerators by Mooney Chemicals, Inc.
[4] 2,5-Dimethyl-2,5-bis(2-ethylhexanoylperoxy)hexane
[5] 60% Methyl ethyl ketone peroxide in dimethyl phthalate.

Equal parts of A and B were mixed and 10 percent by weight of Freon 142B (trichlorodifluoroethane) added in a first run and 10 percent by weight of Freon 11B (trichloromethane) added to a second blend of A and B. Both compositions were placed under vacuum reaching 10 in/HG in 30 seconds and then increased to 20 in/Hg.

Foaming continued until reaching gel time of approximately 6 minutes. A good, very flexible foam resulted in each run with a density of 5.3 pounds per cubic foot. The foam remained spongy and soft after air cure and overnight oven cure at 185° F. for 16 hours.

EXAMPLE 2

The run of Example 1 was repeated omitting the hydrated alumina filler. An open cell, spongy foam resulted which remained spongy after post-curing 2 hours at 180° F.

EXAMPLE 3

Runs were made using Ashland 172-12 unsaturated polyester resin containing 33 weight percent styrene having an elongation of 8 to 15 percent with the following recipes:

|  | Part A | Part B |
| --- | --- | --- |
| Resin 172-12 | 100 | 100 |
| Dow Corning 193 surfactant | 5 | 5 |
| Cardox 40E | 0.5 | — |
| Cobalt (12%) | 0.3 | — |
| Potassium Hex-cem | 0.4 | — |
| Lupersol 256 | — | 0.5 |
| Lupersol DDM | — | 0.5 |
| Dimethyl-para-toluidine | — | 0.5 |

Equal parts of A and B were mixed. Then added were 100 parts hydrated alumina and 10 parts of sodium bicarbonate, both amounts being based on 100 parts by weight of Resin 172-12. Upon the addition of 8 percent by weight based on the total composition (resin and filler, etc.) of a solution of 10 weight percent phosphoric acid in water, foaming occurred. The mixture had a gel time of 6 minutes. The result was a flexible foam having a density of 25 to 30 pounds per cubic foot which retained the same flexibility after postcuring at 180° F. for 2 hours.

EXAMPLE 4

Foams were prepared using the recipe of Example 1 except that the surfactant was increased to 6 parts in A and B; the Cardox 40E was increased to 6 parts in A, and the dimethyl-para-toluidine was reduced to 0.65 part in B. A and B were mixed and 10 weight parts of Freon 11B per 100 parts Resin DD-2780-3 were added. Samples were mixed on an air mixer, poured onto a preformed gel coat, and placed in a vacuum system. After 1 minute vacuum was slowly drawn until, after 3 minutes, a 22-in/Hg vacuum was obtained. The flexible foam obtained had a density of about 3 pounds per cubic foot.

EXAMPLE 5

A flexible laminate was made using Richbold resin 94-024 flexible polyester resin containing 42 weight percent styrene and having an elongation of 37.7 percent.

|  | Part A | Part B |
| --- | --- | --- |
| Resin 94-024 | 100 | 100 |
| Sodium bicarbonate | 5 | 5 |
| Cab-O-Sil[(1)] | 1.5 | 1.5 |
| Dow Corning 193 surfactant | 5 | 5 |
| Cardox 40E | 5 | — |
| Cobalt (12%) | 0.35 | — |
| Potassium Hex-cem | 0.4 | — |
| Lupersol 256 | — | 1 |
| Lupersol DDM | — | 0.5 |
| Dimethyl-para-toluidine | — | 1 |
| Black pigment | 1 | 1 |

[(1)]Thioxtropic agent

Equal parts of A and B were mixed and 5 weight percent of the 10 weight percent phosphoric acid solution added. Gel time was 5 minutes. A laminate was made by pouring approximately one-half of the resin blend A plus B into a mold and spreading it out, applying one layer of veil cloth (polyester resin needlepunched mat of 10 mil thickness), adding the balance of the resin, and spreading it out. It was post cured at 180° F. for one hour. Average thickness was 105 mils and the density was 44.2 pounds per cubic foot. Physical properties are given in Example 7.

EXAMPLE 6

A series of flexible foam laminates were made using various reinforcing layers. The basic resin recipe was:

|  | Part A | Part B |
| --- | --- | --- |
| Ashland 172-12 | 100 | 100 |
| Cab-O-Sil (silica) | 2 | 2 |
| Sodium bicarbonate | 5 | 5 |
| Dow Corning 193 surfactant | 5 | 5 |
| Cardox 40E | 3 | — |
| Cobalt (12%) | 0.3 | — |
| Potassium Hex-cem | 0.3 | — |
| Lupersol 256 | — | 0.5 |
| Lupersol DDM | — | 0.5 |
| Dimethyl-para-toluidine | — | 0.3 |
| Black pigment | 1 | 1 |

To equal parts of A and B were added 2.5 parts by weight of a 50 percent solution of wax and styrene per 100 parts of resin 172-12 to reduce oxygen contact with the foam surface and thereby improve surface cure. Based on the weight of the mixture there was added 5 percent of a 10 percent solution of phosphoric acid in water. The following laminates were made:

| Reinforcement | Thickness (mils) | Density (lb/ft$^3$) |
| --- | --- | --- |
| A. Assembly wipe porous paper | 120 | 41.2 |
| B. Kimwipe porous paper | 140 | 41.1 |
| C. Kimwipe Chopped glass Kimwipe | 110 | 39.9 |
| D. Kimwipe Glass Tape Kimwipe | 155 | 43.7 |
| E. Assembly wipe sand on surface | 125 | 54.1 |

Physical properties are given in Example 7.

EXAMPLE 7

Several samples of each of the flexible foam laminates of Examples 5 and 6 were tested and values for tensile strength, tensile modulus, and elongation are given in the following table.

| Foam Laminate | | Tensile Strength lb/in | Tensile Modulus | Elongation percent |
|---|---|---|---|---|
| Example 5 | 1. | 340 | $3.4 \times 10^4$ | 44 |
|  | 2. | 230 | $2.6 \times 10^4$ | 35 |
|  | 3. | 259 | $3.7 \times 10^4$ | 40.5 |
|  | 4. | 264 | $4.0 \times 10^4$ | 42.5 |
|  | 5. | 275 | $3.9 \times 10^4$ | 43 |
| Example 6A | 1. | 460 | $1.1 \times 10^5$ | 14.5 |
|  | 2. | Broke out of gauge area | | |
|  | 3. | Broke out of gauge area | | |
|  | 4. | 444 | $2.2 \times 10^5$ | 11.5 |
|  | 5. | 400 | $1.5 \times 10^5$ | 11.5 |
| Example 6B | 1. | 526 | $2.0 \times 10^5$ | 9.5 |
|  | 2. | 553 | $2.0 \times 10^5$ | 8.8 |
|  | 3. | 521 | $3.9 \times 10^5$ | 11.0 |
|  | 4. | 517 | $2.8 \times 10^5$ | 10.5 |
|  | 5. | 486 | $2.2 \times 10^5$ | 10.0 |
| Example 6C | 1. | 628 | $4.2 \times 10^5$ | 4.5 |
|  | 2. | 676 | $4.1 \times 10^5$ | 7.0 |
|  | 3. | 665 | $2.5 \times 10^5$ | 9.0 |
| Example 6D | 1. | 3711 | $2.1 \times 10^6$ | 1.5 |
|  | 2. | 2893 | $1.8 \times 10^6$ | 1.5 |
|  | 3. | Broke in grip area | | |
|  | 4. | 1959 | $1.4 \times 10^6$ | 3.0 |
| Example 6E | 1. | 366 | $2.4 \times 10^5$ | 7.0 |
|  | 2. | 450 | $2.1 \times 10^5$ | 9.5 |
|  | 3. | 395 | $2.1 \times 10^5$ | 8.0 |
|  | 4. | 416 | $2.9 \times 10^5$ | 9.0 |
|  | 5. | 356 | $1.9 \times 10^5$ | 8.0 |

EXAMPLE 8

A mineral filled flexible foam laminate was made using the recipe of Example 6 omitting the Cab-O-Sil and adding 30 parts by weight of Wollastonite per 100 parts of resin. One layer of cellulose (absorbent paper) was used. Tests on five specimens showed an average tensile strength of 450 pounds per inch, an average tensile modulus of $3.0 \times 10^5$ and an average elongation of 34.6 percent. Runs were also made using hydrated alumina as the filler.

Obviously many variations can be made coming within the broad scope of the invention. Such modifications will be apparent to those skilled in the art.

We claim:

1. A process for producing flexible unsaturated polyester foams comprising mixing Components A and B, each of said Components comprising an unsaturated flexible polyester having an elongation of 8 to 70 percent, an unsaturated cross-linking monomer, a compound which releases carbon dioxide when contacted with an acid, an initiator, and an accelerator, wherein the accelerator in Component A is relatively inactive with the initiator in Component A but relatively active with the initiator in Component B and the accelerator in Component B is relatively inactive with the initiator in Component B but relatively active with the initiator in Component A, adding an acid to said mixture and allowing said mixture to foam and gel.

2. A process for producing flexible unsaturated polyester foam comprising mixing Components A and B, each of said Components comprising an unsaturated flexible polyester, having and elongation of 8 to 70 percent, an unsaturated cross-linking monomer, an initiator, and an accelerator, wherein the accelerator in Component A is relatively inactive with the initiator in Component A but relatively active with the initiator in Component B and the accelerator in Component B is relatively inactive with the initiator in Component B but relatively active with the initiator in Component A, and adding a physical blowing agent to said mixture and allowing said mixture to foam and gel.

3. A process of preparing a flexible unsaturated polyester foam from an unsaturated polyester having an elongation of 8 to 70 percent comprising mixing, on the weight basis the following:

|  | Part A | Part B |
|---|---|---|
| polyester resin | 100 | 100 |
| sodium bicarbonate | 1–15 | 1–15 |
| silicone surfactant | 0–8 | 0–8 |
| 50% benzoyl peroxide in diisobutyl phthalate | 1–10 | — |
| cobalt salt accelerator | 0.05–0.5 | — |
| potassium salt accelerator | 0–1 | — |
| 2,5-dimethyl-2,5-bis(2-ethylhexanoylperoxy)hexane | — | 0.5–10 |
| 60% methyl ethyl ketone peroxide in dimethyl phthalate | — | 0–5 |
| dimethyl-para-toluidine | — | 0.1–1 | mixing Parts A and B and adding sufficient acid to generate carbon dioxide upon contact with said sodium bicarbonate thereby causing said mixture of Parts A and B to foam and gel.

4. A process of preparing a flexible unsaturated polyester foam from an unsaturated polyester having an elongation of 8 to 70 percent comprising mixing, on the weight basis the following:

|  | Part A | Part B |
|---|---|---|
| polyester resin | 100 | 100 |
| silicone surfactant | 0–8 | 0–8 |
| 50% benzoyl peroxide in diisobutyl phthalate | 1–10 | — |
| cobalt salt accelerator | 0.05–0.5 | — |
| potassium salt accelerator | 0–1 | — |
| 2,5-dimethyl-2,5-bis(2-ethylhexanoylperoxy)hexane | — | 0.5–10 |
| 60% methyl ethyl ketone peroxide in dimethyl phthalate | — | 0–5 |
| dimethyl-para-toluidine | — | 0.1–1 | mixing Parts A and B and adding a physical blowing agent thereby causing said mixture of Parts A and B to foam and gel.

5. The process according to claims 1, 2, 3 or 4 wherein an inorganic filler is incorporated in said resin composition prior to foaming.

6. The process according to claims 1, 2, 3 or 4 wherein a porous fabric reinforcement is incorporated in said resin composition prior to foaming.

7. The process according to claims 1, 2, 3 or 4 wherein vacuum is applied during said foaming step.

8. The process according to claims 1, 2, 3 or 4 containing glass reinforcement.

* * * * *